US008764340B2

(12) United States Patent  
Campbell

(10) Patent No.: US 8,764,340 B2  
(45) Date of Patent: Jul. 1, 2014

(54) TRACKLESS TACK COAT

(76) Inventor: Shawn Campbell, Baltimore, MD (US)

( * ) Notice: Subject to any disclaimer, the term of this patent is extended or adjusted under 35 U.S.C. 154(b) by 0 days.

(21) Appl. No.: 13/588,402

(22) Filed: Aug. 17, 2012

(65) Prior Publication Data

US 2013/0045048 A1 Feb. 21, 2013

Related U.S. Application Data

(60) Provisional application No. 61/524,507, filed on Aug. 17, 2011.

(51) Int. Cl.
*E01C 7/24* (2006.01)
*C08L 95/00* (2006.01)
*E01C 3/00* (2006.01)
*E01C 11/00* (2006.01)

(52) U.S. Cl.
CPC ............. *C08L 95/005* (2013.01); *E01C 3/006* (2013.01); *E01C 11/005* (2013.01)
USPC ................................. 404/75; 404/31; 106/277

(58) Field of Classification Search
CPC ........ E01C 11/005; E01C 3/06; C08L 95/005
USPC .................... 404/31, 72, 75, 76, 111; 106/277
See application file for complete search history.

(56) References Cited

U.S. PATENT DOCUMENTS

| | | | | |
|---|---|---|---|---|
| 3,513,005 A * | 5/1970 | Bradshaw et al. | ............. | 427/138 |
| 4,234,346 A | 11/1980 | Latta, Jr. et al. | | |
| 4,335,186 A | 6/1982 | Marzocchi et al. | | |
| 4,430,465 A | 2/1984 | Abbott | | |
| 4,889,880 A * | 12/1989 | Miller | ............................. | 524/71 |
| 5,047,457 A | 9/1991 | Higgins | | |
| 5,051,457 A | 9/1991 | Gelles | | |
| 5,085,896 A | 2/1992 | Marks et al. | | |
| 5,340,391 A | 8/1994 | Grzybowski | | |
| 5,364,894 A * | 11/1994 | Portfolio et al. | ................. | 524/60 |
| 5,451,619 A | 9/1995 | Kluttz et al. | | |
| 5,573,586 A | 11/1996 | Yap et al. | | |
| 5,580,376 A | 12/1996 | Hayner | | |
| 5,604,274 A | 2/1997 | Gallagher et al. | | |
| 5,650,000 A * | 7/1997 | Shuey et al. | ................ | 106/217.8 |
| 5,668,197 A * | 9/1997 | Schilling | .......................... | 524/61 |
| 5,718,752 A | 2/1998 | Kluttz | | |
| 5,735,943 A | 4/1998 | Cody et al. | | |
| 5,904,760 A | 5/1999 | Hayner | | |
| 5,928,418 A | 7/1999 | Tamaki et al. | | |
| 6,027,557 A | 2/2000 | Hayner | | |
| 6,291,571 B1 | 9/2001 | Fisher | | |
| 6,306,937 B1 | 10/2001 | Fields | | |
| 6,599,057 B2 | 7/2003 | Thomas et al. | | |
| 6,758,892 B2 | 7/2004 | Muniandy | | |
| 6,840,991 B2 | 1/2005 | Honma et al. | | |
| 6,846,355 B2 | 1/2005 | Hokkirigawa et al. | | |
| 6,855,754 B2 | 2/2005 | Takamura et al. | | |
| 6,858,315 B2 | 2/2005 | Khan et al. | | |
| 6,927,245 B2 | 8/2005 | Buras et al. | | |
| 7,094,287 B2 | 8/2006 | Poole et al. | | |
| 7,234,284 B2 | 6/2007 | Paradise et al. | | |
| 7,238,408 B2 | 7/2007 | Aschenbeck et al. | | |
| 7,247,664 B2 | 7/2007 | Heimerikx et al. | | |
| 7,452,930 B2 | 11/2008 | Kawakami et al. | | |
| 7,503,724 B2 * | 3/2009 | Blacklidge | ....................... | 404/82 |
| 7,541,059 B2 | 6/2009 | Aschenbeck et al. | | |
| 7,713,345 B2 | 5/2010 | Maldonado et al. | | |
| 7,772,301 B2 | 8/2010 | Fensel et al. | | |
| 7,807,752 B2 | 10/2010 | Masutani et al. | | |
| 7,815,725 B2 | 10/2010 | Reinke et al. | | |
| 7,935,749 B2 | 5/2011 | Carlson | | |
| 7,951,417 B1 | 5/2011 | Wen et al. | | |
| 7,968,627 B2 | 6/2011 | Reinke et al. | | |
| 7,981,466 B2 | 7/2011 | Reinke et al. | | |
| 2008/0190326 A1 | 8/2008 | Fields | | |
| 2010/0199886 A1 | 8/2010 | Day et al. | | |
| 2011/0168055 A1 * | 7/2011 | Lommerts et al. | ............ | 106/277 |

OTHER PUBLICATIONS

Asphalt Pavement: A practical guide to design, production, and maintenance for engineers and architects, by Patrick Lavin, p. 20, Dec. 2003.*

* cited by examiner

*Primary Examiner* — Raymond W Addie
(74) *Attorney, Agent, or Firm* — Whiteford, Taylor & Preston LLP; Peter J. Davis

(57) ABSTRACT

An asphalt emulsion available for high performing, trackless tack coat applications. The tack coat can be used with hot mix asphalt, warm mix asphalt or cold mix asphalt to provide a tack coat on an existing bituminous or concrete pavement surface. The tack coat can also be used for repair of potholes, utility cuts, and general pavement patching areas.

10 Claims, No Drawings

TRACKLESS TACK COAT

CROSS REFERENCE TO RELATED APPLICATIONS

This application claims priority under 35 U.S.C. §119(e) from U.S. Provisional Patent Application Ser. No. 61/524,507, entitled "Trackless Tack Coat" filed with the United States Patent and Trademark Office on Aug. 17, 2011, the specification of which is incorporated herein by reference in its entirety.

BACKGROUND OF THE INVENTION

1. Field of the Invention

This invention relates generally to a method providing an adhesive tack coat for use between pavement layers, such as between layers of asphaltic compositions or between layers of asphaltic materials and other paving or base materials.

2. Description of the Background

In constructing pavement structures with one or more asphaltic layers, it is often necessary to lay each asphaltic layer down on a preceding pavement layer in a predetermined sequence, with a bonding material between the layers. The bonding material, which also may be referred to as a tack coat, acts to provide a degree of adhesion or bonding between the layers, and in some instances, may fuse the layers together. The tack coat also acts to reduce slippage and sliding of the layers relative to other layers in the pavement structure during use or due to wear and weathering of the pavement structure.

Insufficient adhesion between a new layer of pavement and an existing base course, a previously laid pavement layer, or a prepared pavement surface can cause pavement separation and cracking during construction of the structure, as well as subsequent failures and premature deterioration of the pavement structure and/or surface. Such conditions often require costly repairs, can cause damage to vehicles traveling on the surface, and may cause dangerous traffic conditions threatening damage to property and injury to vehicle passengers.

Pavement and road surfaces also require regular maintenance to repair normal wear and tear of the roadway due to vehicular or pedestrian traffic, the effect of weather and environmental conditions, and other factors. In some applications, all or a portion of the traffic bearing surface may be removed through grinding, stripping, or other means, and a new pavement layer is applied to the prepared structure. In other applications, a new pavement layer is placed down on top of the existing pavement structure to provide a new or renewed traffic-bearing surface. To prepare such preexisting pavement structures for application of an additional, new pavement layer, a tack coat often is applied to the preexisting pavement surface to encourage the adhesion and/or fusion of the new pavement material with the preexisting surface and/or structure.

In many instances, the bonding and/or slippage resistance provided by a tack coat is important during the construction of the pavement structure, as well as in the completed structure. As the pavement is constructed, it is important to avoid dislocation of all or portions of the substrate layers as each successive layer is applied to form the structure. Such damage can be significant at the edges of a roadway, which often are not compacted as well as in the middle of the roadway. In many applications, construction vehicles, or other vehicles are permitted to travel over the partially constructed structure, which also may exert stress on the layers that have been applied to form the roadway causing slippage or shifting of the layers.

A tack coat is a thin bituminous liquid asphalt, emulsion, or cutback layer applied between pavement layers to promote bonding. Adequate bonding between layers and especially between the existing road surface and an overlay is critical in order for the completed pavement structure to behave as a single unit and provide adequate strength. If adjacent layers do not bond to one another, they essentially behave as multiple independent thin layers—none of which are designed to accommodate the anticipated traffic-imposed bending stresses. Inadequate bonding between layers can result in delamination (debonding) followed by longitudinal cracking, potholes, and other distresses such as rutting that greatly reduce pavement life. Insufficient adhesion between the base course and roadway pavement material frequently is the cause of pavement separation and cracking during installation, and subsequent failures and premature deterioration of the pavement surface. Such failures may cause dangerous traffic conditions that require costly repairs.

The tack coat itself is typically composed of asphalt by-products and is sticky, an attribute that makes it ideal for use as an adhesive between layers of asphalt. Without the presence of the tack coat, a new layer of asphalt laid upon an existing road would deteriorate much more quickly, often creating potholes and various conditions that decrease the safety of the road.

A tack or bonding coat also may be applied to a base or substrate layer in advance of the application of the next pavement layer. In the meantime, construction or other vehicles are expected to travel over the tack coat without significantly damaging or reducing the effectiveness of the coating. Such damage often occurs, however, when the tack or bonding coating is picked up on the tires or tracks of vehicles traveling over the coated surface. Where this occurs, the asphalt compositions often are tracked onto other pavement surfaces causing disruption to the surrounding area. This tracking also reduces the effectiveness of the tack coat by displacing a portion of the intended volume from the area awaiting a new pavement layer.

Moreover, the tendency of a sticky tack coat to adhere to the tires and wheels of vehicles passing over the surfaces frequently results in the loss of the coatings on entire sections of the base course. This loss of coating substantially interferes with the ability of the tack coat to effectively prime the surface of the base course.

The tack coats typically used in the construction of asphaltic pavement structures are asphalt-containing compositions that are prepared as a liquid, flowable, fluid so that they can be effectively and efficiently applied and spread over a prepared base course or pavement surface. Such asphalt bonding compositions can be liquefied in several ways, such as by heating above their melting temperatures, dissolution into solvents or volatile oils to form cutback asphalt compositions, and by emulsification with water. In the case of cutback asphalt compositions, the cutback becomes "cured" as solvents evaporate leaving the desired asphalt composition.

The pavement surface receiving the tack coat should be clean and dry to promote maximum bonding. Emulsified tack coat materials may be applied to cool and/or damp pavement; however, the length of time needed for the set to occur may increase. Since existing and milled pavements can be quite dirty and dusty, their surfaces should be cleaned off by sweeping or washing before any tack coat is placed, otherwise the tack coat material may bond to the dirt and dust rather than the adjacent pavement layers. This can result in excessive tracking of the tack coat material. Construction vehicles and equipment pick up the tack-dirt mixture on their tires and leave the existing roadway with little or no tack coat in the wheelpaths.

Slippage cracking and delamination are distresses typically seen when cleanliness is lacking.

To provide suitable bonding, tack coatings must provide an adhesive, tacky surface after the composition, emulsion, or coating is cured to bond and/or fuse the pavement or pavement and base layers. The asphalt materials available for use in tack coats are commercially available in different standard grades, with different properties, based on their viscosity, solids content, chemical composition, and other characteristics. One grading measure is the penetration or "pen" value.

The pen value is based on penetration testing where the relative hardness of the asphalt composition is determined at a predetermined temperature, typically about 77° F. (25° C.). One test uses methods such as those described in ASTM D5 (ASTM International) and AASHTO T49 (American Association of State Highway and Transportation Officials). This test measures the distance in dmm (tenths of a millimeter) that a standard needle, under a standard loading, will penetrate a sample in a given time under known temperature conditions. The resulting distance is often referred to as the penetration or "pen" value.

Another common measure of asphalt compositions is the Ring and Ball Softening Point. This softening point test using methods, such as those described in ASTM D36 and/or AASHTO T53, measures the temperature at which an asphalt composition becomes soft and flowable. As used herein, pen values and softening point values are with reference to the above-identified ASTM and AASHTO methods or their equivalents.

Although not formally defined, typically hard (i.e. high melting point) asphalt compositions have pen values of about 40 dmm or less, with softening points greater than about 140° F. (60° C.). Such compositions are often referred to as hard pen or low pen asphalt compositions. Asphalt compositions with pen values between about 40 dmm to about 100 dmm, and with softening points between about 118° F. (48° C.) and about 140° F. (60° C.), are typically referred to as medium, mid, or moderate pen asphalt compositions. Asphalt compositions with pen values greater than 100 dmm and with softening points less than 118° F. (48° C.) are typically referred to as soft or high pen asphalt compositions.

The asphalt compositions often used to form asphalt emulsions for the purposes of forming tack coats typically are soft or medium pen asphalt products. They typically have pen values greater than 40 dmm and softening points less than 140° F. (60° C.). When applied as a tack coat, emulsions using such soft or medium pen asphalt compositions typically provide a relatively sticky, tacky surface under ambient temperature conditions in pavement construction environments. As a result, such tack coats experience significant tracking problems, and may not provide a durable bond between paving surfaces, particularly at elevated temperatures.

Hard pen asphalt compositions (i.e., penetration value of less than about 40 dmm and softening points greater than about 140° F. (60° C.)) have not been used as tack coats in pavement construction due to their high melting points, their limited flowability and very low surface tackiness at ambient temperatures for pavement construction. For example, hard pen asphalt compositions often must be heated to temperatures as high as 400° F. (204° C.) before they become sufficiently flowable to be applied by spreading or spraying, and will have little, if any, surface tackiness when cooled to ambient temperatures for pavement construction. It is normally impractical to maintain hard pen asphalts at such high temperatures for application as a tack coat.

Hard pen asphalt compositions, in addition, are significantly more difficult to emulsify than mid to high (i.e., medium to soft) pen asphalt compositions. Because of their high melting temperatures, hard pen asphalt compositions typically must be heated to relatively high temperatures prior to emulsification, thus often resulting in undesirable emulsion temperatures above the boiling point of water (212° F. (100° C.)). The use of such high temperatures can interfere with the emulsification process, often is impractical in preparing most asphalt containing emulsions, and frequently produces emulsions with undesirable particulate contents and other defects. Additionally, hard pen asphalt emulsions often become unstable during storage and, therefore, must be used shortly after they are prepared. This also renders such products impractical as a tack coat in pavement construction.

Hard pen asphalt compositions and emulsions also have been used in applications where a high melting point is desirable. For example, hard pen asphalt compositions have been used in roofing materials and certain types of asphalt containing sealing compositions. Hard pen asphalt emulsions also have been mixed with clays and sands for use as a seal coating for the exposed surfaces of parking lots and the like.

As a result, cutback asphalts, asphalt emulsions using mid to soft pen asphalts, and mid to soft pen asphalts alone are commonly employed as tack coats for bonding asphaltic pavement materials to preexisting pavements, intermediate pavement courses, and base courses in new construction. Cutback asphalt tack coats typically included asphalt residues in excess of 60% by weight of the total product combined with solvents such as naphthas, kerosenes, oils or other such products to maintain the asphalt compositions in a liquid, flowable condition. The conventional asphalt emulsions typically included products with asphalt residues in a range of from about 25% to 70% or greater by weight of the total product.

A number of difficulties, however, limit the utility of cutback asphalts and conventional asphalt emulsions made with moderate or soft pen asphalt compositions. Some such products can require a relatively long cure time (as long as 2 to 7 days or more) before traffic is permitted to pass over the treated area. Where the next pavement layer cannot be laid down immediately, the cured tack coat remains exposed for extended periods and remains tacky and sticky. Accordingly, vehicle traffic over the treated surfaces often must be shut down until another layer of pavement is applied, and if traffic is allowed to pass, the asphalt tack coatings frequently adheres to the tires and tracks of vehicles traveling over the coated surfaces. This frequently results in lifting and damage to the tack coat and undesirable tracking of the coating to other surfaces via the vehicle tires and tracks.

Damage to the tack coating can substantially interfere with the ability of the coating to properly bond and/or fuse the pavement layers or base together. As a result, the pavement layers may slip or separate with the passage of traffic over the structure and time. This type of damage also may permit water penetration into the pavement surface, which can result in further deterioration due to freeze-thaw cycles or similar stresses. As a result, multiple applications of the tack coat may be required to obtain the desired adhesion between the pavement layers at a significant loss of efficiency and increase in cost. Furthermore, where the coatings are tracked to other surfaces by vehicles, extensive cleanup may be required adding to the expense of a project.

The use of conventional asphalts for tack coats, in addition, often requires equipment adapted to maintain those products at an elevated temperature throughout the application procedure. Such equipment is often expensive to operate and difficult to maintain, which increases the cost and reduces the efficiency of the asphalt tack coats. In addition, as it relates to cutback asphalt products specifically, they contain volatile solvents that can damage the environment and are released into the atmosphere during the curing process. These volatile solvents in asphalt cutbacks further present safety issues during their storage and application. As a result, cutback asphalt products are, or could become, prohibited from general usage in many states.

SUMMARY

The trackless tack coat of the present invention is an asphalt emulsion available for high performing, trackless tack coat applications.

It is, therefore, an object of the present invention to provide a trackless tack coat product that avoids the disadvantages of the prior art.

It is another object of the present invention to provide a tack coat that will have a trackless surface within approximately 10 minutes. A related object of the present invention is to provide a tack coat that will be rain proof within approximately 30 minutes.

Another object of the present invention is to provide a tack coat that can be used with hot mix asphalt, warm mix asphalt or cold mix asphalt. A related object of the present invention is to provide a tack coat that can be used on an existing bituminous or concrete pavement surface. A further related object of the present invention is to provide a tack coat that can be used for repair of potholes, utility cuts, and general pavement patching areas.

DESCRIPTION OF EXEMPLARY EMBODIMENTS

The invention summarized above may be better understood by referring to the following description. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The Trackless Tack Coat of the present invention is specifically formulated for trackless tack coat applications where fast cure, non-tracking attributes and rapid dry times are necessities. The product is formulated for a fast cure, leaving a non-tracking tack coat minutes after application. The trackless tack coat is an anionic asphalt emulsion comprising asphalt, water, and an emulsion agent. The emulsifier is a concentrated surfactant material. The water, asphalt, and emulsifier are mixed through a colloidal mill and at times, a heat exchanger system is used to evacuate the temperature of ingredients as they come out of the colloidal mill to prevent boiling of the water. In contrast to the prior art, the trackless tack coat of the present invention does not require any additives.

The tack coat is a highly versatile asphalt emulsion that is formulated for a variety of applications to allow for a trackless finish. It can be used as a primer whenever asphaltic hot mix, warm mix, or cold mix product is going to be applied. The tack coat provides adhesion of hot mix asphalt and warm mix asphalt for overlay onto an existing bituminous or concrete pavement surface. Alternatively, or in addition, the tack coat provides adhesion of hot mix asphalt, warm mix asphalt or cold mix asphalt for repair of potholes, utility cuts, and general pavement patching areas for State and Federal roadways and private parking areas and roadways.

According to a preferred embodiment, the tack coat should be applied to a surface that is free from all foreign matter. The storage temperature of trackless tack coat material should be approximately 110-130° F. This promotes product uniformity of the emulsion, and decreases sieve development and flow of the product, without causing excessive evaporation of the water component. During storage, the tack coat can be heated to a maximum temperature of approximately 130° F. The tack coat can be applied by brush, squeegee, or spray equipment and should yield a coverage rate in excess of 150 square feet per gallon or 0.05-0.10 gallons/square yard. Preferably, the tack coat should remain dry until it has cured. The trackless tack coat when applied at proper rates will have a trackless surface within approximately 10 minutes and will be rain proof within approximately within 30 to 60 minutes, preferably within 30 minutes. As used in this application, "rain proof" means that the tack coat does not reemulsify if additional water is added. In a preferred embodiment, the tack coat material can be applied when the ambient air temperature is not less than 33° F. and rising.

Upon placement of the new hot mix asphalt, heat from the new layer will liquefy the residual high-modulus asphalt tack, and an excellent bond will be formed between the existing and new hot mix courses. The heat radiating from the new hot mix asphalt will re-liquefy the cured tack coat, forming a bond between the pre-existing substrate and the new hot mix courses.

In a preferred embodiment, the tack coat can be used as provided or may be diluted with additional water. Typically, if the tack coat is diluted with additional water it would then be used as a fog seal over hot mix asphalt, warm mix asphalt, chip seal, slurry seal, micro resurfaced pavements, and concrete pavements.

In some embodiments, the tack coat can be used as provided or may be diluted with additional water for use as a dust palliative over dirt and gravel roads, chip seal, slurry seal pavement surfaces and as a pavement rejuvenator and dust palliative for State, Federal, and private shoulder roadway areas.

The following Table provides some specific test results for a trackless tack coat of the present invention:

| | INITIAL | SPECIFICATION | |
|---|---|---|---|
| TEST | MATERIAL | MIN | MAX |
| Sieve Test (US No. 20 Iron Wire Sieve) (%) | .02 | — | .10 |
| Demulsibility (35 cc-0.02NCaCl2) (%) | — | — | — |
| Viscosity, Saybolt Furol @ 25° C. sec (SSU) | 63 | 20 | 100 |
| Asphalt Cement (%) | 58.6 | 40 | 75, preferably 50 |
| Penetration @ 25° C. (dmm) | 12 | 5 | 20, preferably 20 |
| Tacking (min) | Not tack 10 minutes | — | 15 minutes |
| Ring & Ball Softening Point (AASHTO-T-53) (° C.) | 70.6° C. | 45° C. | — |

Notes:
Meets ASTM-D-977

Heating and Circulation Process:

The tack coat of the present invention is a water-based product; therefore, allowing it to freeze, scorch, or boil can cause breaking of the emulsion. The tack coat can preferably be prepared by the following steps:
1. Slowly heat the product to a temperature of approximately 130-140° F.
2. Slowly increase heat to 160° F. while circulating the distributor tank only at 100 to 150 gallons per minute.
3. Circulate the distributor's spray bar upon reaching 160° F.

Application:

The tack coat can be applied by brush, squeegee, or spray equipment. EM-50-TT (the inventor's denomination for a trackless tack coat in accordance with one embodiment of the present invention) can be sprayed when the emulsion's temperature reaches approximately 160° F. in the tank and spray bar line. The pavement surface on which it is applied should be clean and dry prior to product application. The application rate is dependent on state/local guidelines, condition of the surface and/or the type of pavement layer to be applied. Preferably, the tack coat can be applied at a rate of approximately 0.05-0.10 gallons per square yard. The recommended application temperature between 110 and 160° F. This is to promote speed of drying and flow due to varying environmental conditions and ambient air temperatures conditions through the applicable temperature ranges for use of the trackless tack coat.

As with all anionic emulsions, the tack coat of the present invention cannot be mixed with cationic emulsions of any type. Contamination with other products could compromise stability and overall performance. The storage temperature should not exceed 130° F.

It will be appreciated by persons skilled in the art that numerous variations and/or modifications may be made to the invention as shown in the specific embodiments without departing from the spirit or scope of the invention as broadly described. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention might be practiced otherwise than as specifically set forth herein. The present embodiments are, therefore, to be considered in all respects as illustrative and not restrictive.

What is claimed is:

1. A tack coat for bonding asphalt layers, consisting of: asphalt, water, and an anionic emulsifier, wherein the tack coat has a sieve test result of up to about 0.10% (using a No. 20 Iron Wire Sieve), a viscosity of up to about 100 SSU, an asphalt content of at least 50%, a penetration value of up to about 20 dmm, tacks in less than 15 minutes, and a ring and ball softening point greater than 45° C.

2. The tack coat of claim 1, wherein the tack coat meets an ASTM-D-977 standard.

3. The tack coat of claim 1, wherein the tack coat is produced by the method comprising the steps of:
slowly heating the asphalt, water, and anionic emulsion agent to a temperature of approximately 130-140° F. in a distributor tank;
slowly increasing heat to about 160° F. while circulating the distributor tank only at 100 to 150 gallons per minute; and
circulating the distributor's spray bar upon reaching 160° F.

4. The tack coat of claim 1, wherein the emulsifier is a concentrated surfactant comprising no additives or petroleum solvents.

5. The tack coat of claim 1, wherein the tack coat is rain proof within 30 minutes of application.

6. A method for applying the tack coat of claim 1, comprising the steps of:
slowly heating the tack coat to a temperature of approximately 130-140° F. in a distributor tank;
slowly increasing heat to about 160° F. while circulating the distributor tank only at 100 to 150 gallons per minute;
circulating the distributor's spray bar upon reaching 160° F.; and
applying the tack coat to a surface when the tack coat reaches 160° F.

7. The method of claim 6, wherein the applying step is carried out using brush, squeegee, or spray equipment.

8. The method of claim 6, wherein the tack coat is applied at a rate of approximately 0.05-0.10 gallons per square yard.

9. The method of claim 6, further comprising diluting the tack coat with water for application as a dust palliative or fog seal.

10. The method of claim 6, wherein the surface is selected from the group consisting of dirt, gravel, slurry seal pavement, chip seal pavement, hot mix asphalt, warm mix asphalt, micro resurfaced pavements, and concrete pavements.

* * * * *